(12) United States Patent
Holmes

(10) Patent No.: US 8,191,441 B2
(45) Date of Patent: *Jun. 5, 2012

(54) HYBRID POWERTRAIN AND DUAL CLUTCH TRANSMISSION

(75) Inventor: Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/165,250

(22) Filed: Jun. 21, 2011

(65) Prior Publication Data

US 2011/0251011 A1 Oct. 13, 2011

Related U.S. Application Data

(63) Continuation of application No. 12/327,636, filed on Dec. 3, 2008, now Pat. No. 7,963,191.

(51) Int. Cl.
F16H 3/08 (2006.01)

(52) U.S. Cl. .................................................. 74/331

(58) Field of Classification Search ................ 74/331, 74/661, 330
See application file for complete search history.

(56) References Cited

U.S. PATENT DOCUMENTS

| 6,427,547 B1 * | 8/2002 | Bowen ............................ 74/329 |
| 6,427,549 B1 * | 8/2002 | Bowen ............................ 74/331 |
| 7,963,191 B2 * | 6/2011 | Holmes .......................... 74/661 |
| 2010/0132492 A1 | 6/2010 | Holmes |

* cited by examiner

Primary Examiner — Dirk Wright

(57) ABSTRACT

A dual clutch transmission is provided including a transmission input member, a first output member, a first, second, third and fourth gear sets, a first and second countershafts, and a first and second sleeve shafts. In operation, the first countershaft is engaged to the first sleeve shaft or the second countershaft is engaged to the second sleeve shaft, at least one of the first and second gears of the first and second gear sets is engaged to at least one of the first and second sleeve shafts, and at least one of the first and second gears of the third and fourth gear sets is engaged to at least one of the first and second countershafts to establish at least eight forward speed ratios between the transmission input member and the output shaft.

19 Claims, 3 Drawing Sheets

| GEAR | 52 | 54 | 34 | 42 | 36 | 44 | 62 | 72 | 64 | 74 |
|------|----|----|----|----|----|----|----|----|----|----|
| 1 | X |   | X |   |   |   | X |   |   |   |
| 2 |   | X |   | X |   |   |   | X |   |   |
| 3 | X |   |   |   | X |   | X |   |   |   |
| 4 |   | X |   |   |   | X |   | X |   |   |
| 5 | X |   | X |   |   |   |   |   | X |   |
| 6 |   | X |   | X |   |   |   |   |   | X |
| 7 | X |   |   |   | X |   |   |   | X |   |
| 8 |   | X |   |   |   | X |   |   |   | X |

FIG. 3

HYBRID POWERTRAIN AND DUAL CLUTCH TRANSMISSION

CROSS-REFERENCE TO RELATED APPLICATIONS

This application is a continuation of U.S. patent application Ser. No. 12/327,636 filed on Dec. 3, 2008 and as such, claims priority thereto under 35 U.S.C. §120.

FIELD

The present disclosure relates to a powertrain and transmission for a motor vehicle and more particularly to a hybrid powertrain and dual clutch transmission for a motor vehicle.

BACKGROUND

The statements in this section merely provide background information related to the present disclosure and may or may not constitute prior art.

Within the motor vehicle automatic transmission art, the dual clutch transmission (DCT) is a relative newcomer. A typical dual clutch transmission configuration includes a pair of mutually exclusively operating input clutches which drive a pair of layshafts or countershafts disposed on opposite sides of an output shaft. One of each of a plurality of pairs of constantly meshing gears which define the various forward gear ratios is freely rotatably disposed on one of the layshafts and the other of each pair of gears is coupled to the output shaft. A plurality of dog clutches selectively couple one of the gears to the layshaft to achieve a forward gear ratio. After the dog clutch is engaged, the input clutch associated with the active layshaft is engaged.

Dual clutch transmissions are known for their sporty, performance oriented shift characteristics. They typically exhibit good fuel economy due to good gear mesh efficiency and ratio selection flexibility in design. The dog clutches have low spin losses which also contributes to overall operating efficiency.

However, dual clutch transmissions have several unique design considerations. For example, because of the torque throughput during launch and the heat that can be generated during slip, the input clutches must be of a relatively large size. The size requirement applies as well to the cooling system which must be able to dissipate relatively large quantities of heat. Finally, because such transmissions typically have many sets of axially aligned gears, their overall length may be problematic in some platform configurations.

The present invention is directed not only to providing a dual clutch automatic transmission have reduced axial length but also to such a transmission for incorporation into a hybrid powertrain.

SUMMARY

The present invention provides a dual clutch transmission including a transmission input member, a first output member, a first, second, third and fourth gear sets, a first and second countershafts, and a first and second sleeve shafts. The first, second, third and fourth gear sets each have a first, second and third gears. The first and second gears are each intermeshed with the third gear. The third gears of the first and second gearsets are rotatably fixed to the transmission input member. The third gears of the third and fourth gearsets are rotatably fixed to the first output member. The first and second countershafts are disposed parallel to the transmission input member. The first gears of the third and fourth gearsets are each rotatably supported by and selectively engagable to the first countershaft. The second gears of the third and fourth gearsets are each rotatably supported by and selectively engagable to the second countershaft. The first and second sleeve shafts are disposed parallel to the transmission input member. The first gears of the first and second gear sets are each rotatably supported by and selectively engagable to the first sleeve shaft. The second gears of the first and second gearsets are each rotatably supported by and selectively engagable to the second sleeve shaft. The first sleeve shaft is selectively engageable to the first countershaft, and the second sleeve shaft is selectively engageable to the second countershaft, to establish at least eight forward speed ratios between the transmission input member and the output shaft at least one of the first countershaft is engaged to the first sleeve shaft and the second countershaft is engaged to the second sleeve shaft, at least one of the first and second gears of the first and second gear sets is engaged to at least one of the first and second sleeve shafts, and at least one of the first and second gears of the third and fourth gear sets is engaged to at least one of the first and second countershafts.

In another example of the present invention, the dual clutch transmission further includes an electric motor having input shaft and an output shaft. The output shaft is coupled to the transmission input member.

In yet another example of the present invention, the dual clutch further includes an input clutch having an input shaft and an output shaft coupled to the input shaft of the electric motor.

In yet another example of the present invention, the electric motor is bi-directional and provides a reverse speed ratio.

In yet another example of the present invention, the dual clutch transmission further includes four dog clutches. A first of the four dog clutches selectively connects at least one of the first gears of the first and second gearsets to the first sleeve shaft. A second of the four dog clutches selectively connects at least one of the second gears of the first and second gearsets to the second sleeve shaft. A third dog of the four dog clutches selectively connects at least one of the first gears of the third and fourth gearsets to the first countershaft. A fourth of the four dog clutches selectively connecting at least one of the second gears of the third and fourth gears sets to the second countershaft.

In yet another example of the present invention, the dual clutch transmission further includes two multiple disc clutches. A first of the two multiple disc clutches selectively connects the first countershaft to the first sleeve shaft. A second of the two multiple disc clutches selectively connects the second countershaft to the second sleeve shaft.

In yet another example of the present invention, the first sleeve shaft is disposed coaxial to and at least partially covers the first countershaft and the second sleeve shaft is disposed coaxial to and at least partially covers the second countershaft.

In yet another example of the present invention, the dual clutch transmission further includes a differential and a second and a third output shafts. The differential is coupled to the first output member. The second and third output shafts are disposed parallel to the transmission input member and drivingly connected to the differential.

Further features and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting the various states of the two countershaft clutches and four dog clutches in the dual clutch transmission which achieve eight forward speeds or gear ratios;

DETAILED DESCRIPTION

The following description is merely exemplary in nature and is not intended to limit the present disclosure, application, or uses.

Figure 1:
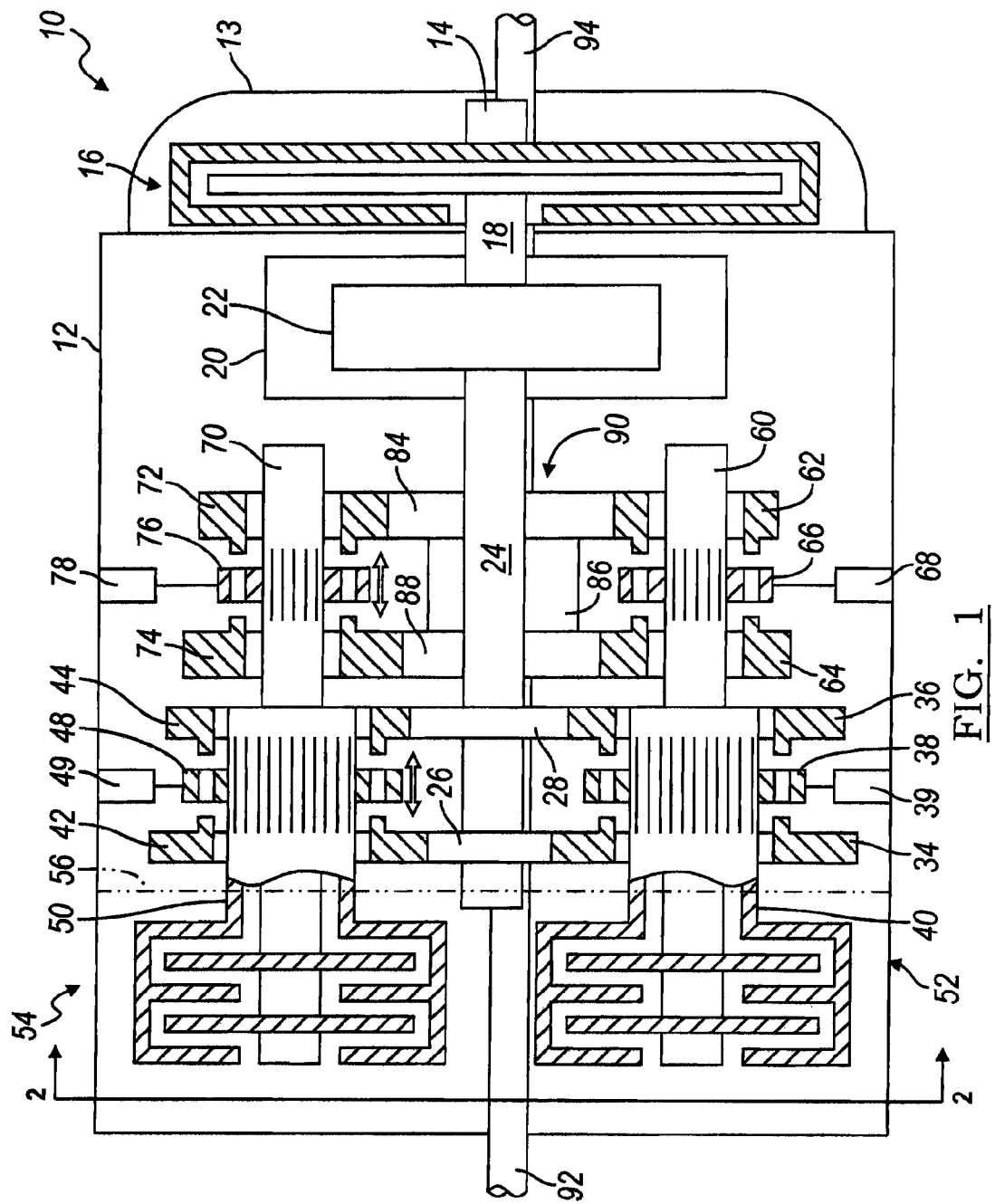
FIG. 1 is a schematic, top plan view of a dual clutch automatic transmission according to the present invention.
Figure 2:
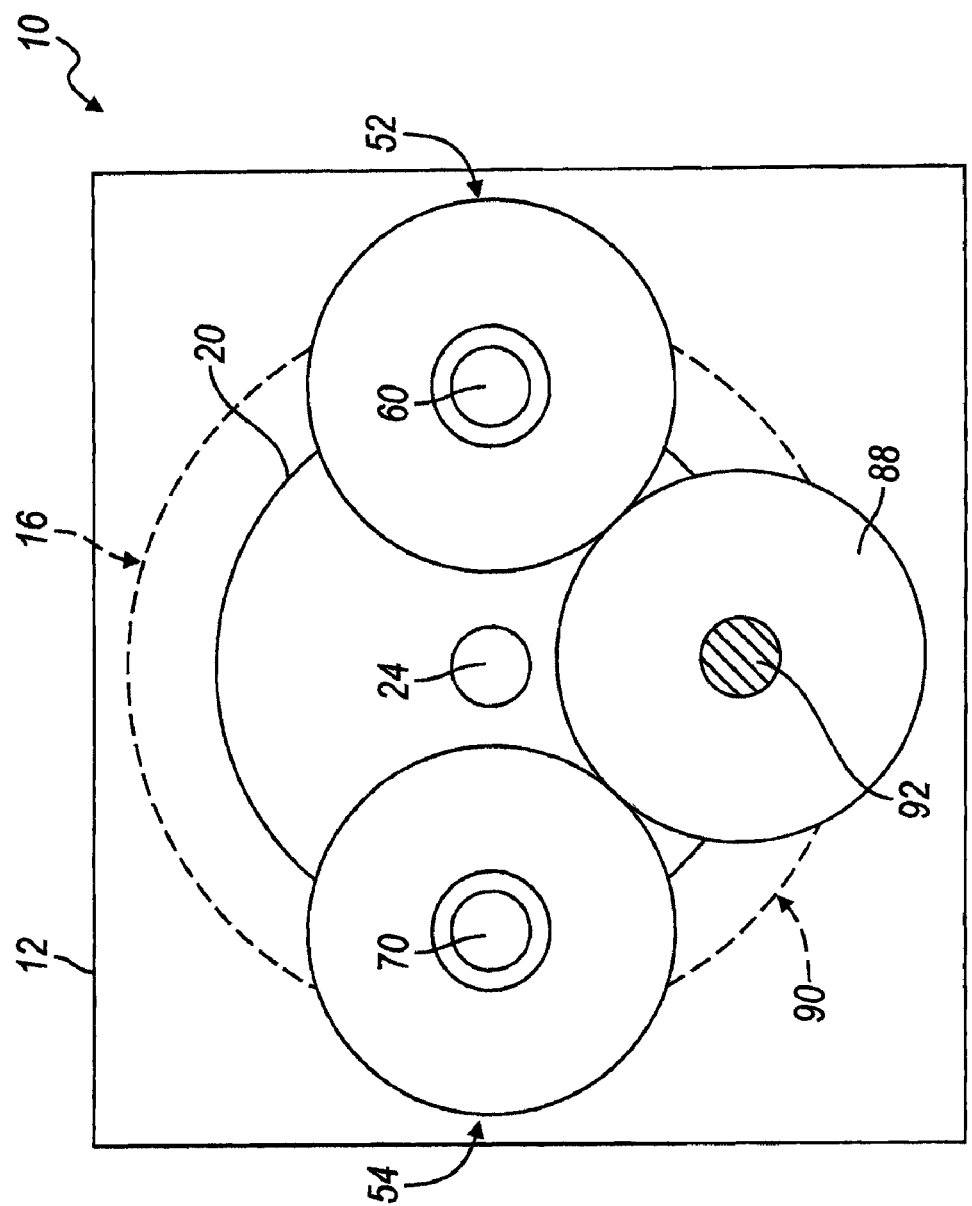
FIG. 2 is a schematic, end elevational view of a dual clutch automatic transmission according to the present invention taken along line 2-2 of FIG. 1.

Referring now to FIGS. 1 and 2, a dual clutch automatic transmission according to the present invention is illustrated and generally designated by the reference number 10. The dual clutch automatic transmission 10 includes a housing 12 which receives, supports and protects the various components of the automatic transmission 10. An input shaft or member 14 receives drive torque from a prime mover such as a gasoline, Diesel or flexible fuel engine (not illustrated) and connects to and drives an input clutch 16. The input clutch 16 which is preferably disposed within a bell housing 13 secured to the front of the transmission housing 12 selectively engages to provide drive torque from the prime mover to a clutch output shaft or member 18 that drives an electric motor 20. The electric motor 20 includes an armature 22 coupled to a main transmission input shaft 24. The electric motor 20 may be an induction motor or more preferably a permanent magnet or brushless DC motor. The main transmission input shaft 24 is coupled to and directly drives a first input drive gear 26 and a second input drive gear 28. The first input drive gear 26 is in constant mesh with a first input gear 34 which is freely rotatably disposed upon a first (odd) quill or drive tube 40 and a second input gear 42 which is freely rotatably disposed upon a second (even) quill or drive tube 50. The first input gear 34 is active when first and fifth gears have been selected and the second input gear 42 is active when second and sixth gears have been selected. Also freely rotatably disposed on the first quill or drive tube 40 and spaced from the first input gear 34 is a third input gear 36 which is in constant mesh with the second input drive gear 28. A fourth input gear 44 is freely rotatably disposed on the second quill or drive tube 50, spaced from the second input gear 42 and in constant mesh with the second input drive gear 28. The third input gear 36 is active when third and seventh gears have been selected and the fourth input gear 44 is active when fourth and eighth gears have been selected.

Between the first input gear 34 and the third input gear 36 is a first dog clutch 38. The first dog clutch 38 is conventional and operates to positively connect either the first input gear 34 or the third input gear 36 to the first quill or drive tube 40. Depending upon the sophistication of the control system and logic, the first dog clutch 38 and other dog clutches referenced below may be equipped with synchronizers to synchronize the speed of the elements of the dog clutches before they are engaged. Associated with the first dog clutch 38 is an operator and shift fork assembly 39 which axially and bi-directionally translates the first dog clutch 38 along the first quill or drive tube 40 and which may be either electric, hydraulic or pneumatic. Likewise, between the second input gear 42 and the fourth input gear 44 are a second dog clutch 48 and optional synchronizers. The second dog clutch 48 and the optional synchronizers are also conventional and operate to first synchronize and then positively connect the second input gear 42 or the fourth input gear 44 to the second quill or drive tube 50. An electric, hydraulic or pneumatic operator and shift fork assembly 49 is associated with the second dog clutch 48.

The first quill or drive tube 40 is connected to and directly drives an input of a first countershaft clutch assembly 52. The first countershaft clutch assembly 52 is preferably a multiple disc or plate friction clutch pack having an electric, hydraulic or pneumatic operator (not illustrated) which selectively connects the first quill or drive tube 40 to a first (odd) layshaft or countershaft 60. Similarly, the second quill or drive tube 50 is connected to and directly drives an input of a second countershaft clutch assembly 54. The second countershaft clutch assembly 54 is also preferably a multiple disc or plate friction clutch pack actuated by an electric, hydraulic or pneumatic operator (not illustrated) which selectively connects the second quill or drive tube 50 to a second (even) layshaft or countershaft 70.

FIG. 1 presents the first and second countershaft clutch assemblies 52 and 54 within the housing 12. So located, the clutch assemblies 52 and 54 will typically be wet plate clutches. It should be appreciated that an equally viable alternate construction comprehends a wall or bulkhead 56 (shown in phantom) which separates the first and second countershaft clutch assemblies 52 and 54 from the other components of the transmission 10 within a dedicated compartment or housing, to allow them to operate as dry plate clutches, to keep clutch debris from contaminating the oil within the transmission housing 12 and to facilitate their easy service by avoiding the need to remove the engine or transmission 10 from the vehicle.

Freely rotatably disposed on the first layshaft or countershaft 60 is a first output gear 62 which is in constant mesh with a first driven output gear 84 which is secured to and rotates with a cage or housing 86 of a differential assembly 90. Also freely rotatably disposed on the second layshaft or countershaft 70 is a second output gear 72 which is also in constant mesh with the first driven output gear 84 of the differential assembly 90. The first output gear 62 is active when fifth or seventh gear is selected and the second output gear 72 is active when sixth or eighth gear is selected. Spaced from the first output gear 62 and also freely rotatably disposed on the first countershaft 60 is a third output gear 64 which is in constant mesh with a second driven output gear 88 secured to the housing 86 of the differential assembly 90. Spaced from the second output gear 72 and freely rotatably disposed on the second countershaft 70 is a fourth output gear 74 which is in constant mesh with the second driven output gear 88. The third output gear 64 is active when first and third gears have been selected and the fourth output gear 74 is active when second and fourth gears have been selected.

Between the first output gear 62 and the third output gear 64 is a third dog clutch 66 and optional synchronizers. The third dog clutch 66 and optional synchronizers are conventional and operate to first synchronize and then connect either the first output gear 62 or the third output gear 64 to the first countershaft 60. An electric, hydraulic or pneumatic operator and shift fork assembly 68 is associated with the third dog clutch 66. Likewise, between the second output gear 72 and the fourth output gear 74 is a fourth dog clutch 76 and optional synchronizers. The fourth dog clutch 76 and optional synchronizers are conventional and operate to first synchronize and then connect either the second output gear 72 of the fourth output gear 74 to the second countershaft 70. An electric, hydraulic or pneumatic operator and shift fork assembly 78 is associated with the fourth dog clutch 76.

The differential assembly 90 and specifically the cage or housing 86 is driven through either the first driven gear 84 or the second driven gear 88, as noted. The differential assembly 90 includes four bevel gears (not illustrated) within the housing 86 disposed in pairs on two perpendicular axes. An opposed (co-axial) pair of the bevel gears are idler gears and the gears of a second opposed pair of bevel gears are coupled to and drive a first output shaft 92 and a second, coaxial output shaft 94. The output shafts 92 and 94 may be coupled to drive wheels through universal joints (all not illustrated).

It should be understood that reverse gear may be provided by any one of a number of alternate means. For example, the input clutch 16 may be disengaged and the electric motor 20 may be energized to rotate in reverse and drive through a low speed (high ratio) gear such as first or second gear. Alternatively, an additional (idler) gear and clutch (not illustrated) may be incorporated into the automatic transmission 10 to operate in conjunction with, for example, the input gear 34 and the output gear 64 on the first countershaft 60.

FIG. 3 is a truth table presenting a clutching scheme for the dual clutch automatic transmission 10. An "X" in a row for a particular speed or gear ratio indicates that the actuator and countershaft clutch or the actuator and dog clutch associated with the gear indicated by the column heading are activated and engaged. It will therefore be appreciated that for each forward gear or speed ratio two gears on either the first countershaft 60 or the second countershaft 70 will be engaged and active. For example, in first gear, the first input gear 34 and the third output gear 64 on the first (odd) countershaft 60 will be active and in second gear the second input gear 42 and the fourth output gear 74 on the second (even) countershaft 70 will be active.

The foregoing description of the invention is merely exemplary in nature and variations that do not depart from the gist of the invention are intended to be within the scope of the invention. Such variations are not to be regarded as a departure from the spirit and scope of the invention and the following claims.

What is claimed is:

1. A dual clutch transmission comprising:
    a transmission input member;
    a first output member;
    a first, second, third and fourth gear sets each having a first, second and third gears, wherein the first and second gears are each intermeshed with the third gear, the third gears of the first and second gearsets are rotatably fixed to the transmission input member, and the third gears of the third and fourth gearsets are rotatably fixed to the first output member;
    a first and second countershafts disposed parallel to the transmission input member, wherein the first gears of the third and fourth gear sets are each rotatably supported by and selectively engagable to the first countershaft and the second gears of the third and fourth gearsets are each rotatably supported by and selectively engagable to the second countershaft;
    a first and second drive tubes disposed parallel to the transmission input member, wherein the first gears of the first and second gear sets are each rotatably supported by and selectively engagable to the first drive tube, the second gears of the first and second gearsets are each rotatably supported by and selectively engagable to the second drive tube, the first drive tube is selectively engageable to the first countershaft, and the second drive tube is selectively engageable to the second countershaft;
    a first and a second multiple disc clutches each selectively connecting for common rotation one of the drive tubes with one of the countershafts; and
    four synchronizers each selectively engaging one of the first and second gears of the gear sets with at least one of the drive tubes and countershafts, and
    wherein one of the first and second clutches and two of the four synchronizers are concurrently engaged in order to establish one of at least eight forward speed ratios between the transmission input member and the first output shaft.

2. The dual clutch transmission of claim 1 further comprising an electric motor having input shaft and an output shaft, wherein the output shaft is coupled to the transmission input member.

3. The dual clutch transmission of claim 2 further comprising an input clutch having an input shaft and an output shaft coupled to the input shaft of the electric motor.

4. The dual clutch transmission of claim 2 wherein the electric motor is bi-directional providing a forward and a reverse rotational directions.

5. The dual clutch transmission of claim 1 wherein a first of the four synchronizers selectively connects at least one of the first gears of the first and second gearsets to the first drive tube, a second of the four synchronizers selectively connects at least one of the second gears of the first and second gearsets to the second drive tube, a third of the four synchronizers selectively connects at least one of the first gears of the third and fourth gearsets to the first countershaft, and a fourth of the four synchronizers selectively connecting at least one of the second gears of the third and fourth gears sets to the second countershaft.

6. The dual clutch transmission of claim 1 wherein the first multiple disc clutch selectively connects the first countershaft to the first drive tube and the second multiple disc clutch selectively connects the second countershaft to the second drive tube.

7. The dual clutch transmission of claim 1 wherein the first drive tube is disposed coaxial to and at least partially overlaps the first countershaft and the second drive tube is disposed coaxial to and at least partially overlaps the second countershaft.

8. The dual clutch transmission of claim 1 further comprising a differential and a second and a third output shafts, wherein the differential is coupled to the first output member, the second and third output shafts are disposed parallel to the transmission input member and drivingly connected to the differential.

9. A dual clutch transmission comprising:
    an input clutch having an input shaft and an output shaft
    an electric motor having input shaft and an output shaft coupled to the input shaft of the electric motor;
    a transmission input member coupled to the output shaft of the electric motor;
    a first output member;
    a first, second, third and fourth gear sets each having a first, second and third gears, wherein the first and second gears are each intermeshed with the third gear, the third gears of the first and second gearsets are rotatably fixed to the transmission input member, and the third gears of the third and fourth gearsets are rotatably fixed to the first output member;
    a first and second countershafts disposed parallel to the transmission input member, wherein the first gears of the third and fourth gear sets are each rotatably supported by and selectively engagable to the first countershaft and the second gears of the third and fourth gearsets are each rotatably supported by and selectively engagable to the second countershaft;

a first and second drive tubes disposed parallel to the transmission input member, wherein the first gears of the first and second gear sets are each rotatably supported by and selectively engagable to the first drive tube, the second gears of the first and second gearsets are each rotatably supported by and selectively engagable to the second drive tube, the first drive tube is selectively engageable to the first countershaft, and the second drive tube is selectively engageable to the second countershaft;

a first and a second multiple disc clutches each selectively connecting for common rotation one of the drive tubes with one of the countershafts; and four synchronizers each selectively engaging one of the first and second gears of the gear sets with at least one of the drive tubes and countershafts, and wherein one of the first and second clutches and two of the four synchronizers are concurrently engaged in order to establish one of at least eight forward speed ratios between the transmission input member and the output shaft.

10. The dual clutch transmission of claim 9 wherein the electric motor is bi-directional providing a forward and a reverse rotational directions.

11. The dual clutch transmission of claim 9 wherein a first of the four synchronizers selectively connects at least one of the first gears of the first and second gearsets to the first drive tube, a second of the four synchronizers selectively connects at least one of the second gears of the first and second gearsets to the second drive tube, a third dog of the four synchronizers selectively connects at least one of the first gears of the third and fourth gearsets to the first countershaft, and a fourth of the four synchronizers selectively connecting at least one of the second gears of the third and fourth gears sets to the second countershaft.

12. The dual clutch transmission of claim 9 wherein the first multiple disc clutch selectively connects the first countershaft to the first drive tube and the second multiple disc clutch selectively connects the second countershaft to the second drive tube.

13. The dual clutch transmission of claim 9 wherein the first drive tube is disposed coaxial to and at least partially covers the first countershaft and the second drive tube is disposed coaxial to and at least partially covers the second countershaft.

14. The dual clutch transmission of claim 9 further comprising a differential and a second and a third output shafts, wherein the differential is coupled to the first output member, the second and third output shafts are disposed parallel to the transmission input member and drivingly connected to the differential.

15. A dual clutch transmission comprising:
an input clutch having an input shaft and an output shaft
an electric motor having input shaft and an output shaft coupled to the input shaft of the electric motor;
a transmission input member coupled to the output shaft of the electric motor;
a first output member;
a first, second, third and fourth gear sets each having a first, second and third gears, wherein the first and second gears are each intermeshed with the third gear, the third gears of the first and second gearsets are rotatably fixed to the transmission input member, and the third gears of the third and fourth gearsets are rotatably fixed to the first output member;

a first and second countershafts disposed parallel to the transmission input member, wherein the first gears of the third and fourth gear sets are each rotatably supported by and selectively engagable to the first countershaft and the second gears of the third and fourth gearsets are each rotatably supported by and selectively engagable to the second countershaft;

a first and second drive tubes disposed parallel to the transmission input member, wherein the first gears of the first and second gear sets are each rotatably supported by and selectively engagable to the first drive tube, the second gears of the first and second gearsets are each rotatably supported by and selectively engagable to the second drive tube, the first drive tube is selectively engageable to the first countershaft, and the second drive tube is selectively engageable to the second countershaft;

a first and second multiple disc clutches, wherein the first multiple disc clutch selectively connects the first countershaft to the first drive tube and the second multiple disc clutch selectively connects the second countershaft to the second drive tube; and four synchronizers each selectively engaging one of the first and second gears of the gear sets with at least one of the drive tubes and countershafts, and wherein one of the two clutches and two of the four synchronizers are concurrently engaged in order to establish one of at least eight forward speed ratios between the transmission input member and the output shaft.

16. The dual clutch transmission of claim 15 wherein the electric motor is bi-directional providing a forward and a reverse rotational directions.

17. The dual clutch transmission of claim 15 wherein a first of the four synchronizers selectively connects at least one of the first gears of the first and second gearsets to the first drive tube, a second of the four synchronizers selectively connects at least one of the second gears of the first and second gearsets to the second drive tube, a third dog of the four synchronizers selectively connects at least one of the first gears of the third and fourth gearsets to the first countershaft, and a fourth of the four synchronizers selectively connecting at least one of the second gears of the third and fourth gears sets to the second countershaft.

18. The dual clutch transmission of claim 15 wherein the first drive tube is disposed coaxial to and at least partially covers the first countershaft and the second drive tube is disposed coaxial to and at least partially covers the second countershaft.

19. The dual clutch transmission of claim 15 further comprising a differential and a second and a third output shafts, wherein the differential is coupled to the first output member, the second and third output shafts are disposed parallel to the transmission input member and drivingly connected to the differential.

* * * * *